(12) United States Patent
Hunsaker et al.

(10) Patent No.: US 12,098,557 B2
(45) Date of Patent: Sep. 24, 2024

(54) PANEL FOR STONES AND RELATED METHODS OF USE

(71) Applicant: Old Mill Brick LLC, Bluffdale, UT (US)

(72) Inventors: Garrick Hunsaker, Bluffdale, UT (US); Austin Hunsaker, Bluffdale, UT (US)

(73) Assignee: Old Mill Brick LLC, Bluffdale, UT (US)

( * ) Notice: Subject to any disclaimer, the term of this patent is extended or adjusted under 35 U.S.C. 154(b) by 0 days.

(21) Appl. No.: 17/477,071

(22) Filed: Sep. 16, 2021

(65) Prior Publication Data
US 2022/0090387 A1    Mar. 24, 2022

Related U.S. Application Data

(60) Provisional application No. 63/080,636, filed on Sep. 18, 2020.

(51) Int. Cl.
*E04B 2/00*    (2006.01)
*B32B 3/14*    (2006.01)
(Continued)

(52) U.S. Cl.
CPC ............ *E04F 13/0878* (2013.01); *B32B 3/14* (2013.01); *B32B 3/30* (2013.01); *B32B 5/18* (2013.01); *B32B 7/08* (2013.01); *B32B 7/12* (2013.01); *B32B 13/045* (2013.01); *E04B 1/7625* (2013.01); *E04B 1/7629* (2013.01); *E04B 1/80* (2013.01); *E04F 13/0885* (2013.01); *E04F 13/14* (2013.01); *B32B 2266/0228* (2013.01);
(Continued)

(58) Field of Classification Search
CPC .... B32B 3/30; B32B 7/08; B32B 3/14; B32B 2607/00; E04F 13/0885; E04F 13/0878; E04F 13/14; E04B 1/7629
See application file for complete search history.

(56) References Cited

U.S. PATENT DOCUMENTS

| | | |
|---|---|---|
| 1,432,222 A | 10/1922 | Edith |
| 1,926,257 A | 9/1933 | Bawtenheimer |

(Continued)

FOREIGN PATENT DOCUMENTS

| | | |
|---|---|---|
| EP | 1164231 | 12/2001 |
| JP | 2002339545 | 11/2002 |

(Continued)

OTHER PUBLICATIONS

International Search Report and Written Opinion dated Jan. 4, 2022 for international application PCT/US2021/050635.

(Continued)

*Primary Examiner* — Basil S Katcheves
(74) *Attorney, Agent, or Firm* — Dorsey & Whitney LLP

(57) ABSTRACT

Panels for coupling stone or brick units to a wall structure are disclosed herein. The panels can include an expanded polystyrene foam having a plurality of laterally extending channels formed on one or more of a first and second side of the panel. The channels can aid in adhering a plurality of stone or brick units to the panel. The width of the channels can be less than the width of the stone or brick units such that the stone or brick units are disposed outside the channels when coupled to the panel.

20 Claims, 6 Drawing Sheets

(51) Int. Cl.
| | |
|---|---|
| *B32B 3/30* | (2006.01) |
| *B32B 5/18* | (2006.01) |
| *B32B 7/08* | (2019.01) |
| *B32B 7/12* | (2006.01) |
| *B32B 13/04* | (2006.01) |
| *E04B 1/76* | (2006.01) |
| *E04B 1/80* | (2006.01) |
| *E04F 13/08* | (2006.01) |
| *E04F 13/14* | (2006.01) |

(52) U.S. Cl.
CPC ..... *B32B 2307/304* (2013.01); *B32B 2607/00* (2013.01)

(56) References Cited

U.S. PATENT DOCUMENTS

| | | | |
|---|---|---|---|
| 2,087,541 A | 7/1937 | Koester | |
| 2,198,466 A | 4/1940 | Stolze | |
| 2,208,094 A | 7/1940 | Crandell | |
| 2,392,232 A | 1/1946 | Crafton | |
| 2,419,047 A | 4/1947 | Young | |
| 3,304,673 A | 2/1967 | Ramoneda | |
| 3,499,256 A | 3/1970 | Schaaf et al. | |
| 3,740,910 A | 6/1973 | Taylor et al. | |
| 3,740,911 A | 6/1973 | O'Leary | |
| 3,908,326 A | 9/1975 | Francis | |
| 3,940,549 A | 2/1976 | Whittum et al. | |
| 4,011,702 A | 3/1977 | Matyas | |
| 4,186,536 A | 2/1980 | Piazza | |
| 4,241,554 A | 12/1980 | Infantino | |
| 4,299,069 A | 11/1981 | Neumann | |
| 4,331,726 A | 5/1982 | Cleary | |
| 4,407,104 A * | 10/1983 | Francis | E04C 2/041 52/592.1 |
| 4,492,064 A * | 1/1985 | Bynoe | E04D 13/172 52/309.8 |
| 4,589,241 A | 5/1986 | Volpenhein | |
| 4,662,140 A | 5/1987 | Porter et al. | |
| 4,712,349 A * | 12/1987 | Riley | E04D 11/02 52/309.12 |
| 4,809,470 A * | 3/1989 | Bauer | E04F 13/0801 52/592.1 |
| 4,841,705 A | 6/1989 | Fuhrer | |
| 4,956,949 A | 9/1990 | Francis | |
| 5,191,744 A | 3/1993 | Bowes | |
| 5,228,937 A | 7/1993 | Passeno | |
| 5,245,810 A | 9/1993 | Foss | |
| 5,311,714 A | 5/1994 | Passeno | |
| 5,373,676 A * | 12/1994 | Francis | E04F 13/0862 52/387 |
| 5,501,049 A * | 3/1996 | Francis | E04F 13/0862 52/387 |
| 5,526,630 A | 6/1996 | Francis et al. | |
| 5,551,195 A | 9/1996 | Vanderstukken | |
| 6,164,037 A | 12/2000 | Passeno | |
| 6,516,578 B1 * | 2/2003 | Hunsaker | E04F 13/147 52/745.1 |
| 7,121,051 B2 | 10/2006 | Hunsaker | |
| 7,677,007 B2 | 3/2010 | Parker | |
| 7,984,594 B1 | 7/2011 | Propst | |
| 8,375,677 B1 * | 2/2013 | Weiler | E04G 15/061 52/745.1 |
| 8,887,469 B2 | 11/2014 | Macdonald et al. | |
| 9,145,676 B2 | 9/2015 | Long et al. | |
| 9,267,260 B2 | 2/2016 | MacDonald et al. | |
| 9,309,667 B2 | 4/2016 | Thompson et al. | |
| 9,359,811 B2 | 6/2016 | Hughes et al. | |
| 9,556,619 B2 * | 1/2017 | Hunsaker | E04F 13/147 |
| 9,598,891 B2 | 3/2017 | Knoblauch et al. | |
| 9,963,875 B1 | 5/2018 | Prygon | |
| 11,015,339 B2 | 5/2021 | Hunsaker | |
| 11,549,259 B2 | 1/2023 | Hunsaker | |
| 2003/0121225 A1 * | 7/2003 | Hunsaker | E04F 13/0862 52/745.1 |
| 2003/0213212 A1 | 11/2003 | Passeno | |
| 2005/0086904 A1 * | 4/2005 | Foley | E04C 2/288 52/782.1 |
| 2005/0183385 A1 * | 8/2005 | Ohanesian | E04H 17/168 52/782.1 |
| 2006/0272264 A1 | 12/2006 | Parker | |
| 2009/0205277 A1 * | 8/2009 | Gibson | E04D 13/1625 52/656.1 |
| 2012/0096785 A1 | 4/2012 | Weeks | |
| 2012/0260603 A1 | 10/2012 | Thompson et al. | |
| 2013/0067845 A1 | 3/2013 | MacDonald et al. | |
| 2013/0111842 A1 | 5/2013 | Long et al. | |
| 2013/0125487 A1 * | 5/2013 | Power | E04B 1/7076 52/302.3 |
| 2014/0318035 A1 | 10/2014 | Costa | |
| 2015/0096257 A1 | 4/2015 | Sinnathamby et al. | |
| 2016/0281413 A1 | 9/2016 | Knoblauch et al. | |
| 2017/0067248 A1 | 3/2017 | Vairo et al. | |
| 2019/0338533 A1 * | 11/2019 | Palladino | B32B 5/245 |
| 2020/0032513 A1 | 1/2020 | DeVito | |
| 2020/0308829 A1 | 10/2020 | Hunsaker | |
| 2020/0325291 A1 * | 10/2020 | Nakano | B32B 27/304 |
| 2020/0338799 A1 * | 10/2020 | Retterath | B32B 27/283 |
| 2020/0354965 A1 * | 11/2020 | Attebery, II | B32B 3/266 |
| 2021/0062502 A1 | 3/2021 | Archer et al. | |
| 2022/0010551 A1 | 1/2022 | Hunsaker | |
| 2022/0074204 A1 | 3/2022 | Gray | |
| 2022/0136236 A1 | 5/2022 | O'Meara | |

FOREIGN PATENT DOCUMENTS

| | | |
|---|---|---|
| JP | 2004092312 | 3/2004 |
| KR | 100704012 | 4/2007 |
| WO | 2020198241 A1 | 10/2020 |

OTHER PUBLICATIONS

"Cultured Stone Product Selection Guide", Brochure, Cultured Stone Corporation, Box 270, Napa, CA, 1999.
"Harristone", Brochure, G.S. Harris Co., Inc. 2795 Pennsylvania Ave., Ogden, UT, Dec. 1999.
"U.S. Brick Systems", Brochure. Sweet's Calalogue, vol. 2, Reference No. 04245/USB, BuyLine 2736, 1995.
"U.S. Brick Systems", Brochure, 3700 Buffalo Speedway, Houston, TX, Feb. 21, 2021.
"Western Thin Brick and Tile", Brochure, 3711 East Superior, Phoenix, AZ (printed before Feb. 12, 2001.
Extended European Search Report dated Nov. 7, 2022 received in European patent application No. 20777556.0.
International Search Report and Written Opinion dated Jun. 19, 2020 for international application PCT/US2020/024490.
Non-Final Office Action dated Jul. 3, 2023 issued in U.S. Appl. No. 18/066,070.
Notice of Allowance dated Feb. 23, 2021 for U.S. Appl. No. 16/828,714.
Notice of Allowance dated Oct. 17, 2023 issued in U.S. Appl. No. 18/066,070.
Notice of Allowance dated Sep. 14, 2022 received in U.S. Appl. No. 17/328,272.
Office Action dated May 23, 2022 for U.S. Appl. No. 17/328,272.
"U.S. Brick Systems", Installation Guide and Details, Real Brick Products, Inc., P.O. Box 200, Perry, MI, Jul. 1999.
"U.S. Brick Systems", Brochure, Sweet's Catalogue, vol. 2, Reference No. 04245/USB, BuyLine 2736, 1995.
"U.S. Brick Systems", Brochure, 3700 Buffalo Speedway, Houston, TX, printed before Feb. 12, 2001.

* cited by examiner

US 12,098,557 B2

PANEL FOR STONES AND RELATED METHODS OF USE

RELATED APPLICATIONS

This application claims priority to U.S. Provisional Patent Application No. 63/080,636, filed Sep. 18, 2020 and titled "PANEL FOR STONES AND RELATED METHODS OF USE," which is incorporated herein by reference in its entirety.

TECHNICAL FIELD

The present disclosure relates generally to building materials and structures. More particularly, the present disclosure relates to panel systems used on home and building walls.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the accompanying drawings in which:

DETAILED DESCRIPTION

Figure 1:
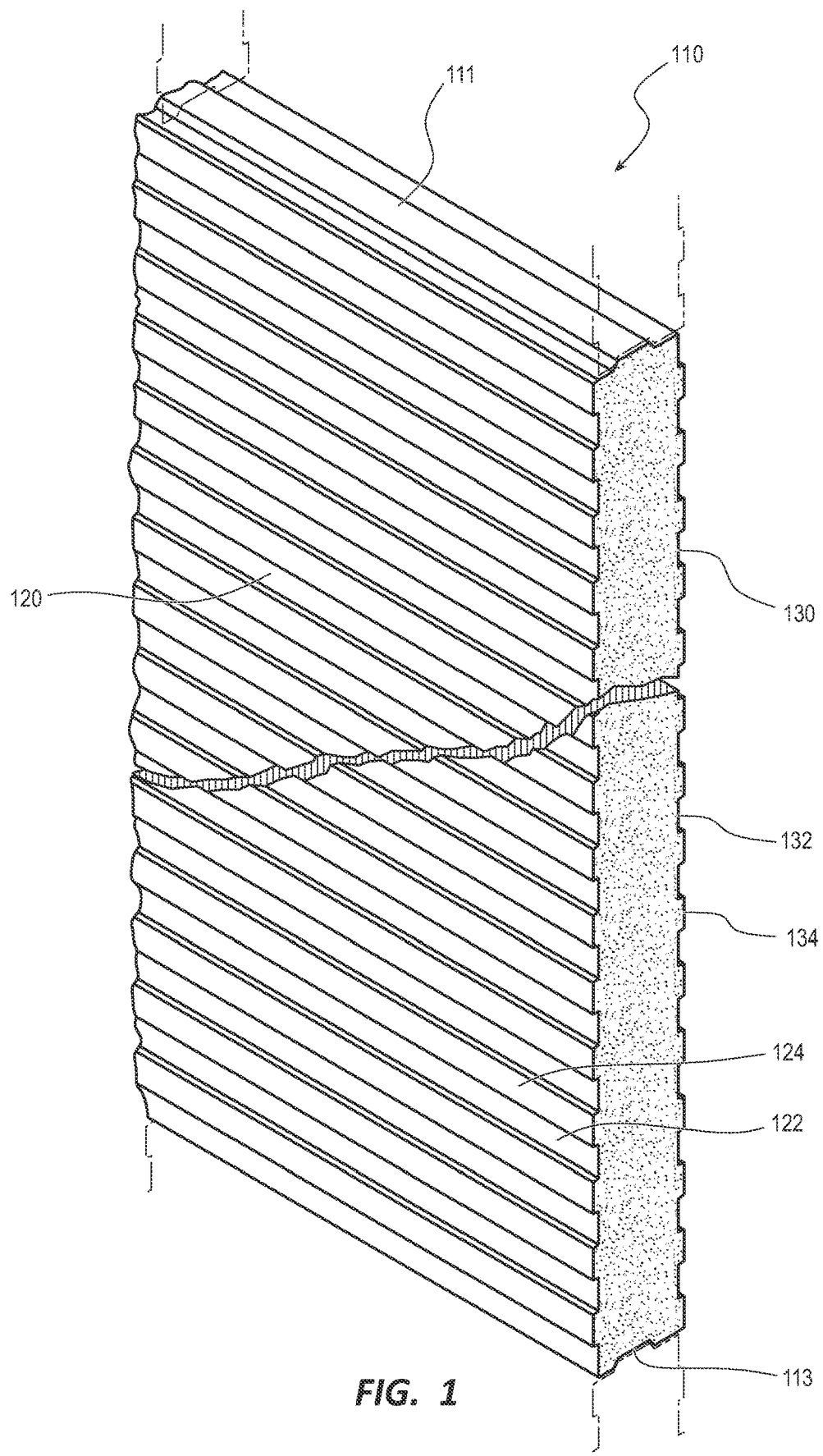
FIG. 1 is a perspective view of a panel according to one embodiment of the present disclosure.

Stone and brick systems are commonly used as façade/cladding on new or existing architectural structures. Some of these systems use a quick drying glue or adhesive to adhere stones or bricks to a foam panel. Mortar is then placed between the stones or bricks to give the stones or bricks structural integrity and to complete the wall system.

Problems often arise due to poor adhesion between the stones or bricks and the foam panels. In attempts at solving these problems, prior stone and brick systems have used various methods to increase the adhesive strength between the stones or bricks and the foam panels. Some of these systems, for example, use a "friction-fit" or "snap-fit" engagement between the stone or brick units and the foam panels into which the stone or brick units are disposed.

One problem with these "friction-fit" or "snap-fit" systems is that only certain sizes and shapes of stones or bricks may be used. For instance, in a "friction-fit" or "snap-fit" system, the stones or bricks are disposed within pre-formed recesses disposed in the foam panels. If the stones or bricks do not match the size of the recesses, the "friction-fit" or "snap-fit" system fails to work. Additionally, there is limited surface area available on the stone or brick units for mortar bonding. For instance, the mortar only contacts a portion of the stone or brick unit extending out of the recess in the foam panel. This area can be very small, and may not provide enough surface area to achieve a strong bond between adjacent stones or bricks.

Disclosed herein are panels that facilitate a strong adhesive bond between adjacent stones or bricks and the foam panels. Irregular sized and shaped stones or bricks are readily accepted and adhered to the panels. The panels also allow for increased surface area for mortar contact, resulting in a stronger bond between adjacent stones or bricks.

Embodiments may be understood by reference to the drawings, wherein like parts are designated by like numerals throughout. It will be readily understood by one of ordinary skill in the art having the benefit of this disclosure that the components of the embodiments, as generally described and illustrated in the figures herein, could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

It will be appreciated that various features are sometimes grouped together in a single embodiment, figure, or description thereof for the purpose of streamlining the disclosure. Many of these features may be used alone and/or in combination with one another.

The phrases "coupled to" and "in communication with" refer to any form of interaction between two or more entities, including mechanical, electrical, magnetic, electromagnetic, fluid, and thermal interaction. Two components may be coupled to or in communication with each other even though they are not in direct contact with each other. For example, two components may be coupled to or in communication with each other through an intermediate component.

Figure 2:
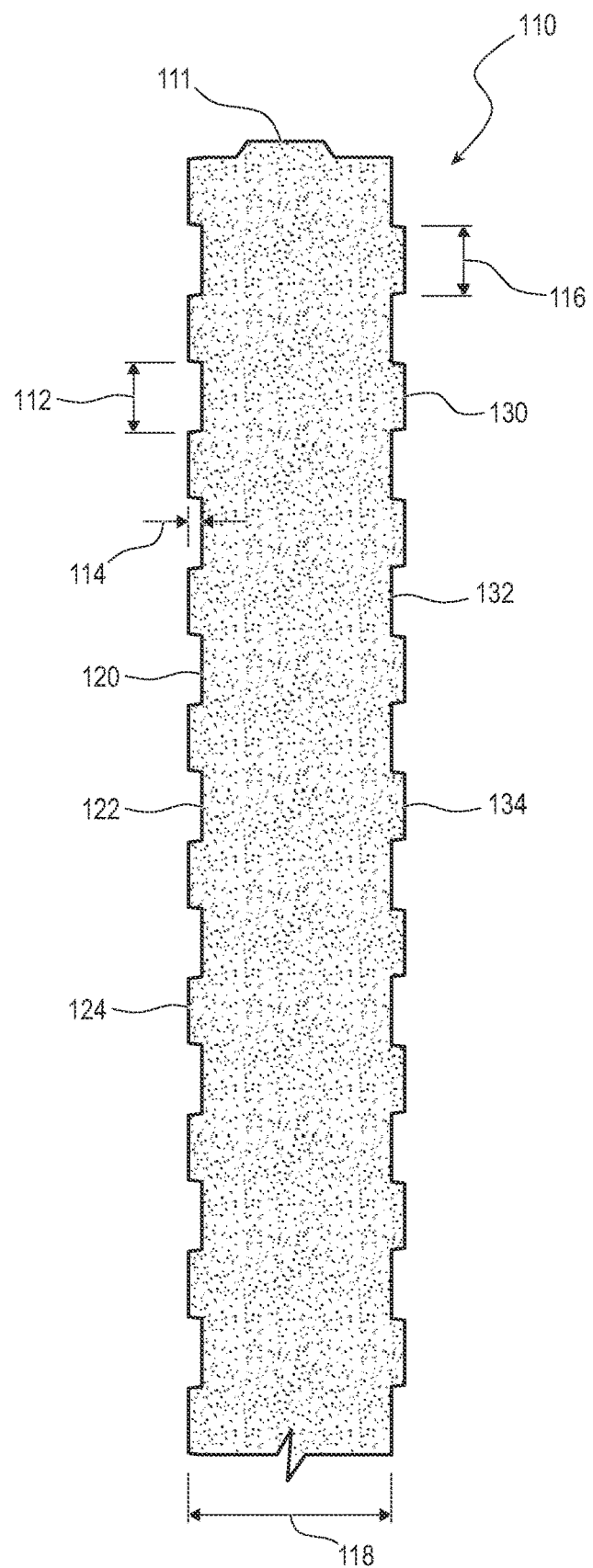
FIG. 2 is a side view of the panel of FIG. 1.

FIG. 1 is a perspective view of a panel 110 according to an embodiment of the present disclosure. FIG. 2 is a side view of the panel 110. The panel 110 can be formed of various materials. In one embodiment, the panel 110 is formed from an expanded polystyrene foam or insulation material, commonly referred to as beaded polystyrene foam. Expanded polystyrene foam panels can provide for increased surface area for bonding between an adhesive, the stone or brick units, and the foam panel. However, suitable panels for use in the system of the present disclosure may alternatively be formed from metals, polymers, or other materials.

As shown in FIGS. 1 and 2, the panel 110 comprises a first side 120 and a second side 130. One or both of the first and second sides 120, 130 comprises a plurality of laterally extending channels 122, 132. In the illustrated embodiment, for example, each of the first and second sides 120, 130 comprises a plurality of laterally extending channels 122, 132. The channels 122, 132 are each defined by a pair of laterally extending protrusions 124, 134, which can be integrally formed with the panel 110 (e.g., cut directly into a sheet of expanded polystyrene foam or otherwise molded into place). The channels 122, 132 also extend across the lateral width of the panel 110, from one edge to another. In other embodiments, the channels 122, 132 extend across a majority of, or only a portion of, the lateral width of the panel 110.

In some embodiments, channels 122, 132 laterally extend along each of the first and second sides 120, 130 of the panel 110. In such instances, the panel 110 can be reversable, and either side 120, 130 can be used to couple to a plurality of stone or brick units, and either side 120, 130 can be used to couple to a wall substrate. Thus, in such embodiments, the panel 110 can be flipped or otherwise oriented in either direction (e.g., the first side 120 or second side 130 can be oriented towards the wall substrate). In other embodiments, channels 122 laterally extend along only on one side 120. In such embodiments, the side 120 with channels 122 can be coupled to a plurality of stone or brick units, and the other side (e.g., a side without channels) can be coupled to a wall substrate (e.g., with one or more mechanical fasteners, etc.).

The channels 122, 132 can provide various advantages to the panel 110. For instance, during use, the channels 122 on one side 120 can aid in adhering stone or brick units to the panel 110. In such instances, the channels 122 can provide increased surface area for the adhesive to adhere. In particular, an adhesive can be disposed within or otherwise conform to at least a portion of the channels 122, which aids in adhering a stone or brick unit to the panel 110. The channels 132 on the other side 130 can also provide added benefits. For instance, the channels 132 on the other side 130 can also provide increased surface area for an adhesive to adhere. In particular, an adhesive can be disposed within or otherwise conform to at least a portion of the channels 132, which aids in adhering the panel 110 to a wall substrate. The channels 132 also provide voids that allow for the passage of fluids, such as liquids and/or gases. For example, liquids (such as water) and gases (such as air) can pass between the panel 110 and wall substrate by flowing through the channels 132. Trapping fluids (liquids and/or gases) between the panel 110 and wall substrate can be detrimental, and thus the passage and/or drainage of fluids is advantageous in many ways.

The size and/or shape of the channels 122, 132 can vary as desired. In the illustrated embodiment, for example, the channels 122, 132 are substantially rectangular. In other embodiments, the channels 122, 132 can be substantially U-shaped or substantially V-shaped, etc. The width 112 and/or depth 114 of the channels 122, 132 can also vary. In some embodiments, the width 112 of the channels 122, 132 is less than about 1 inch, between about ¼ inches and about 1 inch, or between about ¼ inches and about ½ inches. In some embodiments, the distance 116 between channels 122, 132 is less than about 1 inch, between about ¼ inches and about 1 inch, or between about ¼ inches and about ½ inches. And in some embodiments, the depth 114 of the channels 122, 132 is less than about ½ inch, or is between about 1/16 inches and about 5/16 inches.

The size, shape, and/or thickness 118 of the panel 110 can also vary. For example, in some embodiments the panel 110 is a substantially rectangular structure that is between about 2 feet and about 10 feet long, or between about 2 feet and about 8 feet long, and is between about 2 feet and about 10 feet tall, or between about 2 feet and about 8 feet tall. In certain embodiments, the thickness 118 of the panel 110 is between about ½ inches and about 12 inches, between about ½ inches and about 6 inches, or between about ½ inches and about 4 inches. Other shapes and/or sizes are also contemplated.

With continued reference to FIGS. 1 and 2, the panel 110 can further comprise complementary mating features for coupling adjacent panels 110 together. For instance, the panel 110 in the illustrated embodiment comprises a tongue 111 and groove 113 extending laterally along the top and bottom surfaces of the panel 110, respectively. As can be appreciated, the tongue 111 of a first panel 110 can be used to mate with a groove of an adjacent panel, and the groove 113 of the first panel 110 can be used to mate with a tongue of another adjacent panel. If desired, complementary mating features (e.g., tongue and groove features) can also be disposed on the lateral or side surfaces of the panel 110. Other types of mating features can also be used.

The panel 110 can be formed in various ways. In some embodiments, the panel 110 is cut from sheet of material. In such embodiments, the channels 122, 132 are cut into the sheet of material thereby also forming the protrusions 124, 134. In some of such embodiments, a plurality of panels 110 are cut from a single sheet of material. For instance, as shown in the illustrated embodiment, the channels 122 on the first side 120 laterally align with the protrusions 134 on the second side 130. In such instances, cutting channels 122 in a surface of one panel 110 may result in simultaneously forming protrusions on a surface of a second panel, which can minimize wasted material. Similarly, cutting the tongue along a top surface of the panel 110 may result in simultaneously forming a groove in a bottom surface of a second panel. If desired, the panel 110 can be molded rather than cut, depending on the material being used.

Further, while the plurality of channels 122, 132 in the illustrated embodiment are substantially similar in size and dimension, it will be appreciated that the size and/or shape of the different channels 122, 132 can vary if desired. Additionally, the panel 110 can provide insulation to a wall or building structure to which it is adhered.

Figure 3:
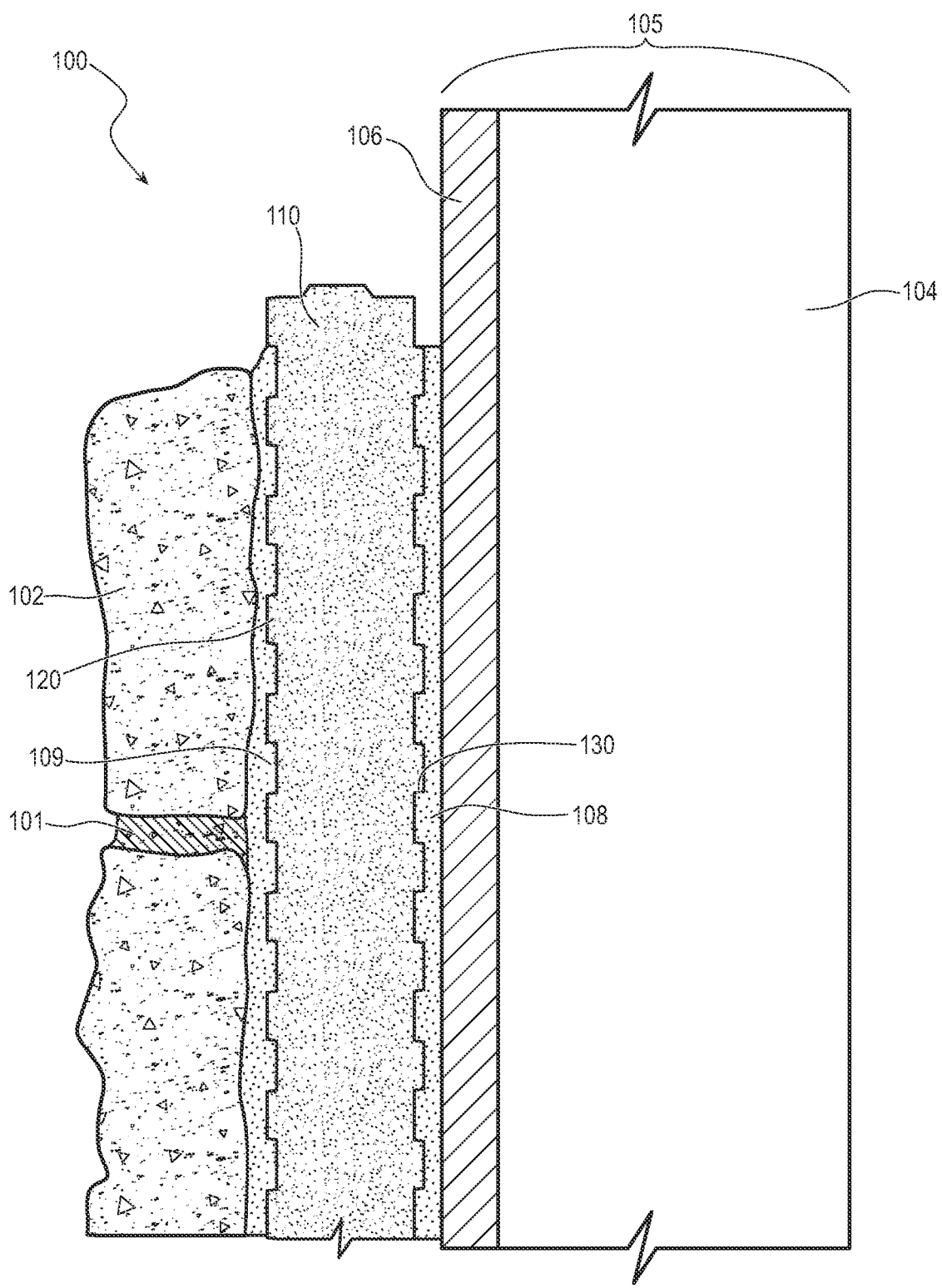
FIG. 3 is a side view of a system incorporating the panel of FIG. 1.

FIG. 3 depicts a side view of a wall system 100 incorporating the panel 110 of FIGS. 1 and 2. As shown in FIG. 3, the wall system 100 comprises a plurality of stone or brick units 102, one or more panels 110, and a wall substrate 105. More particularly, the first side 120 of the panel 110 is coupled to a plurality of stone or brick units 102, and the second side 130 of the panel 110 is coupled to the wall substrate 105.

In forming the wall system 100, one or more panels 110 can be first coupled to a wall substrate 105. Various types of wall substrates 105 are within the scope of this disclosure, including, but not limited to, wood substrates, metal substrates, and cementitious substrates. The wall substrate 105 may also optionally include a sheathing 106 and/or weather barrier on top of a substrate component 104. In the illustrated embodiment, the panel 110 is coupled to the wall substrate 105 with a construction adhesive 108. Various types of construction adhesives 108 can be used, including but not limited to, polymer based adhesives, polymer modified cements, cement based adhesives, vinyl based adhesives, acrylic based adhesives, and general construction adhesives. In other embodiments, the panel 110 is coupled to the wall substrate 105 via one or more mechanical fasteners, such as screws, nails, or bolts.

Figure 4:
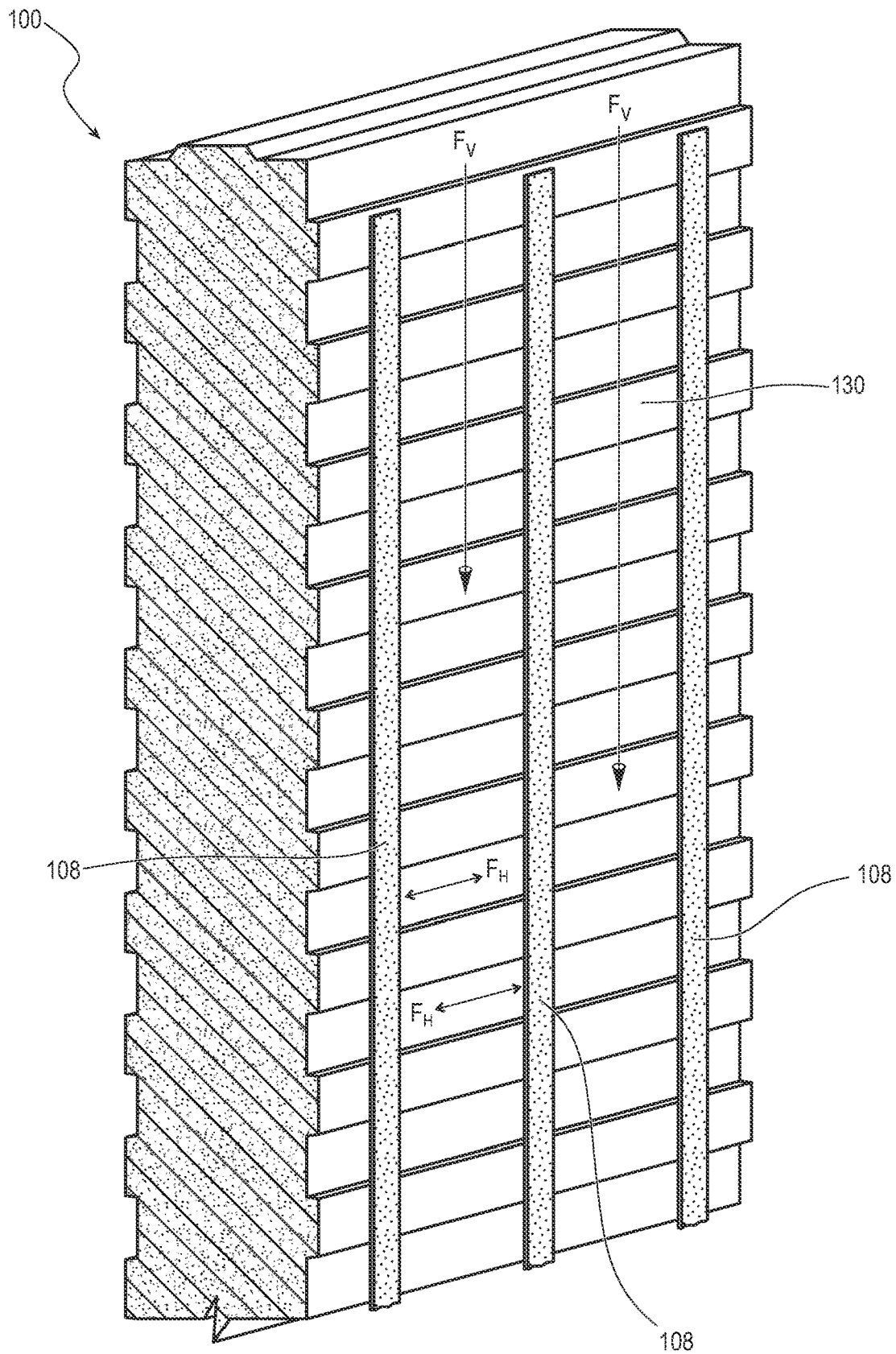
FIG. 4 is a rear view of a panel of FIG. 1.

In certain of such embodiments, the construction adhesive 108 is applied to at least a portion of the second side 130 of the panel 110. For instance, the construction adhesive 108 can be applied in vertical and/or horizontal strips or otherwise intermittently disposed on the second side 130 of the panel 110. FIG. 4, for example, depicts a rear view of the panel 110 with vertical strips of adhesive 108. Vertical strips of adhesive 108 or intermittently disposing the adhesive 108 on the second side 130 can provide vertical flow paths $F_v$ (i.e., areas free of adhesive 108) that allow passage or drainage of fluids (water or air) between the panel 110 and the wall substrate 105. As previously discussed, fluids (water or air) can also flow within the channels 132 which can create horizonal flow paths FH, further allowing passage or drainage of the fluids between the panel 110 and wall substrate 105. In other embodiments, the construction adhesive 108 is applied over a majority of the second side 130 of the panel 110. Alternatively, the construction adhesive 108 can be applied to the wall substrate 105 upon which the panel 110 is placed. For instance, vertical and/or horizontal strips or intermittent adhesive can be placed upon the wall substrate 105, after which one or more panels 110 can be pressed into the adhesive and against the wall substrate 105.

After the adhesive 108 is disposed on either the surface 130 of the panel 110 and/or the wall substrate 105, the panel 110 can be adhered to the wall substrate 105. For instance, the panel 110 can be pressed against or otherwise disposed against the wall substrate 105. As the panel 110 is disposed against the wall substrate 105, portions of the adhesive 108 can flow or otherwise be forced into the channels 132, which can cause a portions of the adhesive 108 to conform to portions of the channels 132 resulting in adhesive 108 contacting an increased surface area of the panel 110. This can result in a strong adhesive bond between the panel 110 and the wall substrate 105.

The plurality of stone or brick units 102 can then be coupled to the first side 120 of the panel 110 with a construction adhesive 109. Various types of stone or brick units 102 can be used. Illustrative stone or brick units include, but are not limited to, stone, rock, marble, brick, thin brick, tile and the like. Various sizes and/or shapes of the stone and brick units 102 can also be used. Various types of construction adhesives 109 can be used, including but not limited to, polymer based adhesives, polymer modified cements, cement based adhesives, vinyl based adhesives, acrylic based adhesives, and general construction adhesives.

In some embodiments, adhesive 109 can be placed on the rear face of the stone or brick units 102, after which the stone or brick units 102 can be pressed against or applied to the panel 110. In other embodiments, adhesive 109 can be placed on the surface 120 of the panel 110, after which the stone or brick units 102 can be pressed against or applied to the panel 110. As the stone or brick units 102 are pressed or otherwise disposed against the panel 110, portions of the adhesive 109 can be forced into the channels 122, which can cause a portions of the adhesive 109 to conform to portions of the channels 122 resulting in adhesive 109 contacting an increased surface area of the panel 110. This can result in a strong adhesive bond between the panel 110 and the stone or brick units 102.

As shown in FIG. 3, the width of the channels 122 is smaller than the stone or brick units 102 such that the stone or brick units 102 are not disposed within the channels 122. Rather, adhesive 109 is disposed inside the channels 122 which then adheres the stone or brick units 102 to the surface 120 of the panel 110. Mortar 101 can thereafter be applied between the stone of brick units 102 to further strengthen the bond between the adjacent stone or brick units 102 and the panel 110, and to complete the wall system 100. In some embodiments, the channels 122 can also be used as alignment features to aid in aligning or placing the stone or brick units 102. For instance, a user can visually follow the channels 122 as they apply stone or brick units 102 to the panel 110.

As further shown in FIG. 3, in some embodiments there is a layer of adhesive 109 disposed between all areas of the stone or brick units 102 and the panel 110. Without limitation, in some embodiments the adhesive 109 may also be marginally affected by gravity such that the thickness of the layer of adhesive 109 is greater towards the bottom of the wall system 100 than the top. This is exemplified in FIG. 3, wherein the thickness of the adhesive 109 gradually increases from the top to the bottom of the wall system 100.

Figure 5:
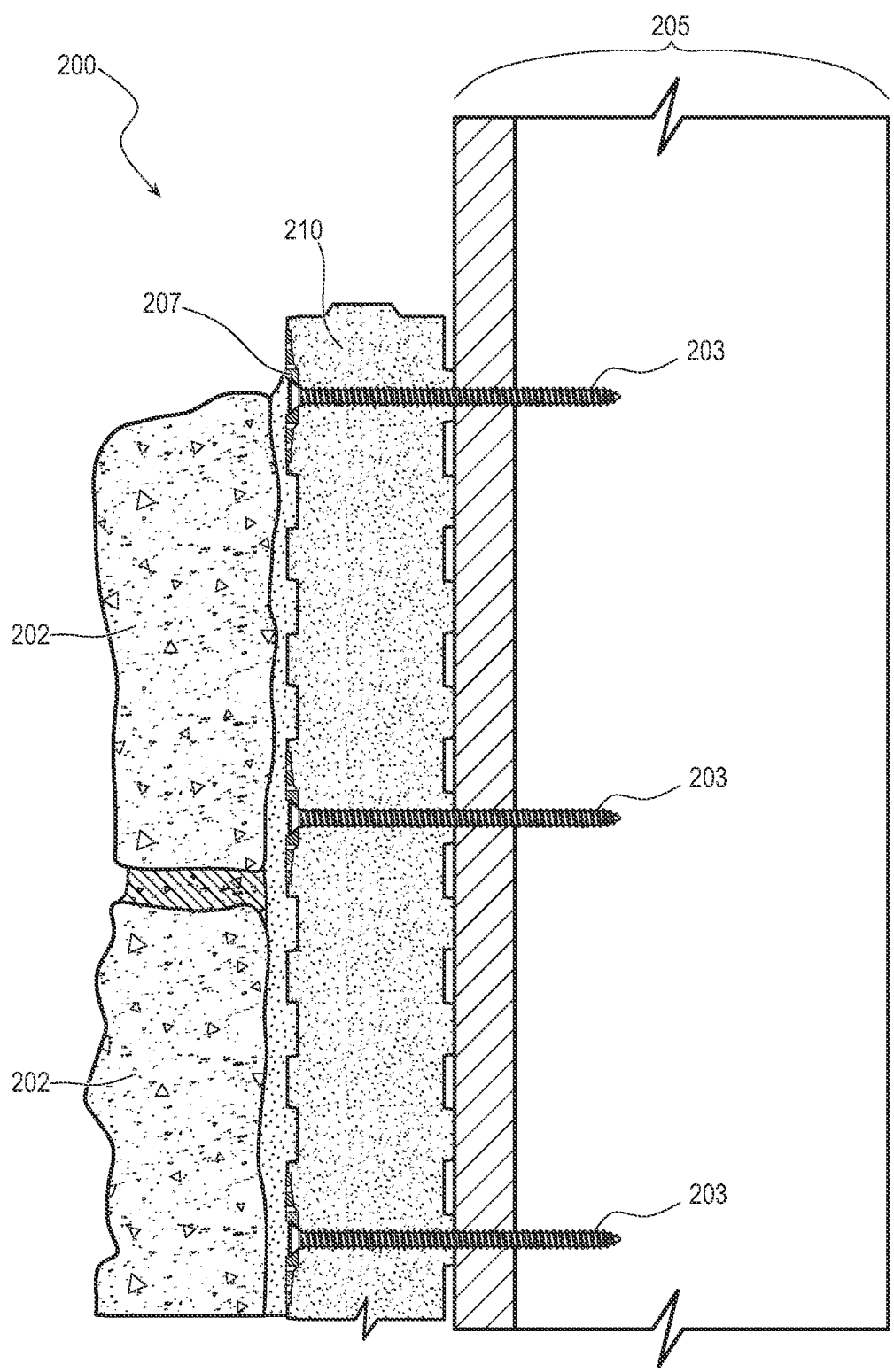
FIG. 5 is a side view of another system incorporating the panel of FIG. 1.
Figure 6:
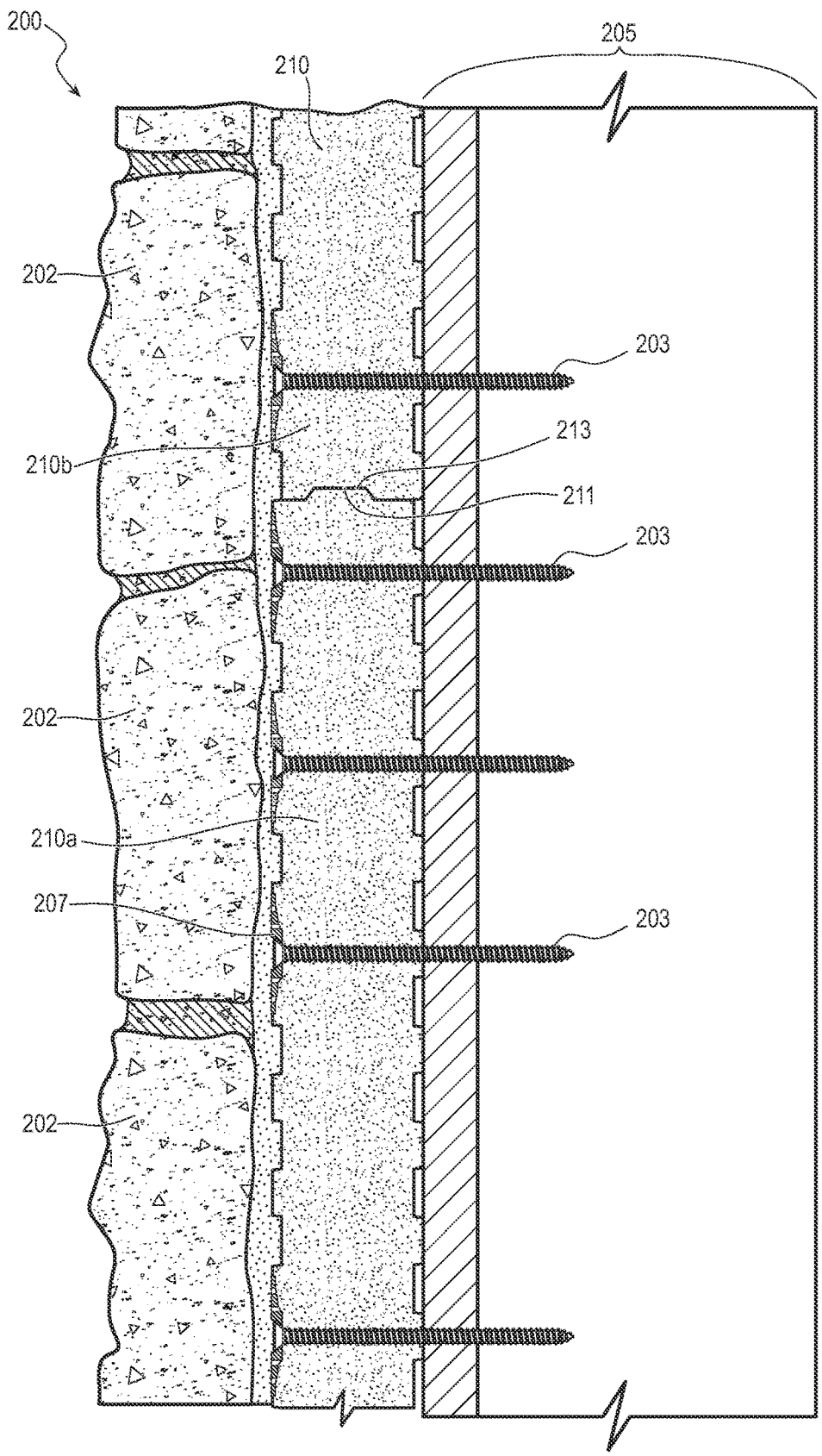
FIG. 6 is a side view of another system incorporating the panel of FIG. 1.

FIGS. 5 and 6 depict a wall system 200 according to another embodiment. As shown in FIGS. 5 and 6, the wall system 200 comprises a plurality of stone or brick units 202, one or more panels 210, and a wall substrate 205. As further shown in FIGS. 5 and 6, the one or more panels 210 can be coupled to the wall substrate 205 via one or more mechanical fasteners 203, such as screws, nails, or bolts. Additional mounting hardware 207 can also optionally be used as desired, such as washers and the like.

FIG. 6 depicts a plurality of wall panels 210a, 210b coupled to the wall substrate 205. As shown therein, mating features 211, 213 of the panels 210a, 210b are also coupled or engaged. In particular, a tongue 211 mating feature of a first panel 210a is coupled to a groove 213 mating feature of a second panel 210b. A portion of the stone or brick units 202 can also be coupled to both the first and second panels 210a, 210b, which can aid in minimize cracking near the junction between panels 210a, 210b.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. For example, a method of forming a wall system may include one or more of the following steps: coupling a panel to a wall substrate; coupling a plurality of stone or brick units to the panel; and applying mortar between the plurality of stone or brick units. One or more additional steps can also be employed.

References to approximations are made throughout this specification, such as by use of the term "about." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. All ranges also include both endpoints.

Similarly, in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. Moreover, the order of the steps or actions of the methods disclosed herein may be changed by those skilled in the art without departing from the scope of the present disclosure. In other words, unless a specific order of steps or actions is required for proper operation of the embodiment, the order or use of specific steps or actions may be modified. The scope of the invention is therefore defined by the following claims and their equivalents.

The invention claimed is:

1. A wall system, comprising:
   a panel having a first side and a second side, wherein each of the first side and the second side comprises a plurality of laterally extending channels defined by a plurality of laterally extending protrusions;
   a wall substrate, wherein the second side of the panel is coupled to the wall substrate such that a fluid can flow in the laterally extending channels on the second side of the panel; and
   a plurality of stone or brick units coupled to the first side of the panel with a construction adhesive, wherein the plurality of stone or brick units are disposed outside the channels on the first side of the panel, and wherein the construction adhesive extends at least partially into the channels on the first side of the panel to aid in adhering the stone or brick units to the panel.

2. The wall system of claim 1, wherein the second side of the panel is coupled to the wall substrate such that the fluid can flow vertically between the second side of the panel and the wall substrate.

3. The wall system of claim 1, wherein the panel further comprises mating features that are configured to mate with corresponding mating features on an adjacent panel.

4. The wall system of claim 1, wherein a width of the channels is between about ¼ inches and about 1 inch.

5. The wall system of claim 1, wherein a depth of the channels is between about 1/16 inches and about 5/16 inches.

6. The wall system of claim 1, wherein a distance between adjacent channels is between about ¼ inches and about 1 inch.

7. The wall system of claim 1, wherein the laterally extending channels on the first side of the panel align with the laterally extending protrusions on the second side of the panel.

8. The wall system of claim 1, wherein the panel comprises an expanded polystyrene foam.

9. The wall system of claim 1, wherein the panel is coupled to the wall substrate with a construction adhesive.

10. The wall system of claim 1, wherein the panel is coupled to the wall substrate with one or more mechanical fasteners.

11. The wall system of claim 1, further comprising mortar disposed between the plurality of stone or brick units.

12. The wall system of claim 1, wherein the fluid comprises at least one of a liquid or a gas.

13. The wall system of claim 1, wherein the panel is configured to provide insulation to the wall system.

14. A wall system, comprising:
    an expanded polystyrene foam panel having a first side and a second side, wherein each of the first side and the second side comprises a plurality of laterally extending channels defined by a plurality of laterally extending protrusions, wherein the panel further comprises mating features that are configured to mate with corresponding mating features on an adjacent panel;
    a wall substrate, wherein the second side of the panel is coupled to the wall substrate such that a fluid can flow in the laterally extending channels on the second side of the panel; and
    a plurality of stone or brick units coupled to the first side of the panel with a construction adhesive, wherein the plurality of stone or brick units are disposed outside the channels on the first side of the panel, and wherein the construction adhesive extends at least partially into the channels on the first side of the panel to aid in adhering the stone or brick units to the panel.

15. The wall system of claim 14, wherein a width of the channels on the first side of the panel is between about ¼ inches and about 1 inch.

16. The wall system of claim 14, wherein a depth of the channels on the first side of the panel is between about 1/16 inches and about 5/16 inches.

17. The wall system of claim 14, wherein a distance between adjacent channels on the first side of the panel is between about ¼ inches and about 1 inch.

18. A method for forming a wall system, comprising:
    obtaining a panel comprising a first side and a second side, each of the first side and the second side comprising a plurality of laterally extending channels defined by a plurality of laterally extending protrusions;
    coupling the panel to a wall substrate such that a fluid can flow in the laterally extending channels on the second side of the panel; and
    coupling a plurality of stone or brick units to a first side of the panel with a construction adhesive, wherein the plurality of stone or brick units are disposed outside the channels on the first side of the panel when coupled to the panel, and wherein the construction adhesive extends at least partially into the channels on the first side of the panel to aid in adhering the stone or brick units to the panel.

19. The method of claim 18, wherein each of the first side and the second side comprises a plurality of laterally extending channels defined by a plurality of laterally extending protrusions.

20. The method of claim 18, wherein coupling the plurality of stone or brick units comprises pressing the plurality of thin brick units having a width greater than the width of the channels onto the panel.

* * * * *